United States Patent
Conrad et al.

(10) Patent No.: US 6,228,151 B1
(45) Date of Patent: May 8, 2001

(54) APPARATUS AND METHOD FOR SEPARATING PARTICLES FROM A CYCLONIC FLUID FLOW

(75) Inventors: Wayne Ernest Conrad, Hampton; Dave Petersen, Courtice, both of (CA)

(73) Assignee: G.B.D. Corp., Cayman Islands ( * ) Notice: Subject to any disclaimer, the term of this patent is extended or adjusted under 35 U.S.C. 154(b) by 0 days.

(21) Appl. No.: 09/376,473

(22) Filed: Aug. 18, 1999

(51) Int. Cl.$^7$ .................................................. B01D 45/12
(52) U.S. Cl. ............................... 95/271; 55/424; 55/426; 55/439; 55/459.1; 55/DIG. 3
(58) Field of Search .............. 95/271; 55/459.1, 55/459.3, 437.439, 424.436, DIG. 3

(56) References Cited

U.S. PATENT DOCUMENTS

| | | |
|---|---|---|
| 1,600,762 | 9/1926 | Hawley . |
| 1,797,812 | 3/1931 | Waring .................................. 55/459.1 |
| 1,937,765 | 12/1933 | Leathers . |
| 2,015,464 | 9/1935 | Saint-Jacques ........................ 183/83 |
| 2,152,114 | 3/1939 | Van Tongeren ....................... 183/83 |
| 2,542,634 | 2/1951 | Davis et al. ........................... 55/426 |
| 2,678,110 * | 5/1954 | Madsen ................................. 55/426 |
| 2,731,102 | 1/1956 | James .................................... 183/34 |
| 2,811,219 * | 10/1957 | Wenzl .................................. 55/459.1 |
| 2,846,024 * | 8/1958 | Bremi ................................... 55/426 |
| 2,913,111 | 11/1959 | Rogers ................................. 55/426 |
| 2,917,131 * | 12/1959 | Evans ................................... 55/424 |
| 2,937,713 | 5/1960 | Stephenson et al. ................. 55/426 |
| 2,942,691 | 6/1960 | Dillon ................................... 55/426 |
| 2,946,451 | 7/1960 | Culleton ............................. 210/512.1 |
| 2,981,369 | 4/1961 | Yellott . |
| 3,032,954 | 5/1962 | Racklyeft ............................. 55/282 |
| 3,130,157 | 4/1964 | Kelsall et al. ...................... 210/512 |
| 3,200,568 | 8/1965 | McNeil ................................. 55/191 |
| 3,204,772 * | 9/1965 | Ruxton ................................. 55/459.1 |
| 3,217,469 | 11/1965 | Eckert .................................. 55/204 |
| 3,269,097 | 8/1966 | German ................................ 55/337 |
| 3,372,532 | 3/1968 | Campbell ............................. 55/394 |

(List continued on next page.)

FOREIGN PATENT DOCUMENTS

| | | |
|---|---|---|
| 112778 | 4/1940 | (AU) . |
| 875134 | 4/1953 | (DE) . |
| 4232382C1 | 3/1994 | (DE) . |
| 0647114 | 3/1997 | (EP) . |
| 700791 | 8/1951 | (GB) . |
| PCT/GB93/01325 | 6/1993 | (GB) ................ A47L/9/16 |
| 2282979 | 4/1995 | (GB) . |
| PCT/GB96/00336 | 2/1996 | (GB) ................ A47L/9/16 |
| 2298598 | 11/1996 | (GB) . |
| PCT/GB99/02313 | 2/2000 | (GB) ................ A47L/9/16 |
| PCT/JP79/00131 | 5/1979 | (JP) .................. C07G/7/00 |
| PCT/US97/15074 | 8/1997 | (US) ................... F26B/5/08 |
| WO80/0256 | 11/1980 | (WO) . |
| WO98/09121 | 3/1998 | (WO) . |
| WO98/43721 | 10/1998 | (WO) . |
| WO00/04816 | 2/2000 | (WO) ............... A47L/09/16 |

*Primary Examiner*—Duane S. Smith
(74) *Attorney, Agent, or Firm*—Reed Smith Hazel & Thomas LLP

(57) ABSTRACT

An anti-reentrainment device is provided for use with a cyclone separator. The anti-reentrainment device has a plurality of vane upwardly extending members positioned in the bottom of a cyclone chamber and extending radially inwardly across the bottom. The vanes separate the bottom of the cyclone from the cyclonic fluid flow portion, thereby creating a reduced flow region above deposited particles settling on the bottom of the cyclone. The device impedes the cyclonic flow from reentraining the deposited particles.

30 Claims, 4 Drawing Sheets

U.S. PATENT DOCUMENTS

| | | | |
|---|---|---|---|
| 3,426,513 | * | 2/1969 | Bauer .................... 55/459.1 |
| 3,518,815 | | 7/1970 | McFarland et al. .................. 55/241 |
| 3,530,649 | | 9/1970 | Porsch et al. .................... 55/316 |
| 3,561,824 | | 2/1971 | Homan .................... 302/59 |
| 3,675,401 | * | 7/1972 | Cordes .................... 55/459.1 |
| 3,684,093 | * | 8/1972 | Kono et al. .................... 55/426 |
| 3,822,533 | | 7/1974 | Oranje .................... 55/426 |
| 3,898,068 | | 8/1975 | McNeil .................... 55/426 |
| 3,933,450 | | 1/1976 | Percevaut .................... 55/223 |
| 3,988,132 | | 10/1976 | Oranje . |
| 3,988,133 | | 10/1976 | Schady .................... 55/459 R |
| 4,097,381 | | 6/1978 | Ritzler .................... 210/259 |
| 4,187,088 | | 2/1980 | Hodgson .................... 55/169 |
| 4,218,805 | | 8/1980 | Brazier .................... 15/321 |
| 4,236,903 | | 12/1980 | Malmsten .................... 55/325 |
| 4,382,804 | | 5/1983 | Mellor .................... 55/1 |
| 4,409,008 | | 10/1983 | Solymes .................... 55/261 |
| 4,486,207 | | 12/1984 | Baillie .................... 55/455 |
| 4,678,588 | | 7/1987 | Shortt .................... 210/788 |
| 4,744,958 | | 5/1988 | Pircon .................... 422/193 |
| 4,778,494 | | 10/1988 | Patterson .................... 55/177 |
| 4,826,515 | | 5/1989 | Dyson .................... 55/345 |
| 4,853,011 | * | 8/1989 | Dyson .................... 55/439 |
| 5,078,761 | * | 1/1992 | Dyson .................... 55/459.1 |
| 5,080,697 | | 1/1992 | Finke .................... 55/97 |
| 5,090,976 | * | 2/1992 | Dyson .................... 55/459.1 |
| 5,267,371 | | 12/1993 | Soler et al. .................... 15/327.5 |
| 5,481,780 | | 1/1996 | Daneshvar .................... 15/339 |
| 5,599,365 | | 2/1997 | Alday et al. .................... 55/426 |
| 5,755,096 | | 5/1998 | Holleyman .................... 60/407 |
| 5,858,043 | | 1/1999 | Geise .................... 55/462 |
| 5,893,938 | * | 4/1999 | Dyson et al. .................... 55/459.1 |
| 5,935,279 | | 8/1999 | Kilstrom .................... 55/337 |
| 5,950,274 | | 9/1999 | Kilstrom .................... 15/350 |
| 6,071,095 | | 6/2000 | Verkaart .................... 417/477.9 |
| 6,071,321 | | 6/2000 | Trapp et al. .................... 55/426 |

* cited by examiner

APPARATUS AND METHOD FOR SEPARATING PARTICLES FROM A CYCLONIC FLUID FLOW

FIELD OF THE INVENTION

The present invention relates generally to cyclonic separators. In one particular application, the invention relates to the cyclonic separation of particulate material from an air flow.

BACKGROUND OF THE INVENTION

The use of a cyclone, or multiple cyclones connected in parallel or series, has long been known to be advantageous in the separation of particulate matter from a fluid stream. Typically, a relatively high speed fluid stream is introduced tangentially to a generally cylindrical or frusto-conical container, wherein the dirty air stream is accelerated around the inner periphery of the container. The centrifugal acceleration caused by the travel of the fluid in a cyclonic stream through the cyclone causes the particulate matter to be disentrained from the fluid flow and, eg., to collect at the bottom of the container. A fluid outlet is provided for the extraction of the fluid from the centre of the top of the cyclone container, as is well known in the art.

A typical flow path in a cyclone separator is as follows. Fluid to be treated is introduced tangentially at a fluid inlet located at an upper end of the cyclone container. The fluid stream rotates around the inner surface of the cyclone container, and spirals generally downwardly around the inner surface of the container (if the cyclone container is vertically disposed). At a bottom end of the cyclone container the fluid stream travels radially inwardly, generally along the bottom of the container and then turns upwardly and proceeds vertically up and out of the cyclone container. The particulate matter separating action of the cyclonic flow occurs substantially around the inner surface of the container. Once the fluid moves inwardly to the centre of the container, and upwardly there through, there is little or no dirt separation achieved.

The difficulty experienced with prior art cyclonic separators is the reentrainment of the deposited particles back into the outgoing fluid flow. Deposited particles exposed to a high speed cyclonic flow thereover have a tendency to be reentrained. This is particularly problematic when the container has a solid bottom portion in which the dirt collects. However, there is a potential reentrainment problem even if the bottom of the container has a passageway provided in the bottom thereof to convey the separated particulate material away from the container.

If a high degree of separation is required, it is known to connect a plurality of cyclones in series. While using several cyclones in series can provide the required separation efficiency, it has several problems. First, if the separators are to be used in industry, they generally need to accommodate a high flow rate (eg. if they are to be used to treat flue gas). The use of a plurality of cyclones increases the capital cost and the time required to manufacture and install the separators. Further, the use of a plurality of cyclones increases the space requirements to house the cyclones. Accordingly, there is a need for an improved anti-reentrainment means for cyclonic separators.

SUMMARY OF THE INVENTION

In has now been discovered that a single cyclone having improved efficiency (eg. up to 99% efficiency) may be manufactured by positioning in the cyclone chamber a member for creating a dead air space below the cyclonic flow region of the cyclone chamber. This construction traps separated material below the cyclonic flow region and inhibits the reentrainment of the separated material. Thus, a single cyclone may be used in place of a plurality of cyclones to achieve the same separation efficiency.

In accordance with the instant invention, there is provided a separator for separating entrained particles from a fluid flow, the separator comprising a cyclone chamber having a cyclonic flow region and a bottom, the cyclonic flow region having a centre, a longitudinal axis, an outer peripheral portion, an inner portion and a radial width, a fluid inlet for introducing a cyclonic fluid flow to the cyclonic flow region, a fluid outlet for removing the fluid flow from the cyclone chamber, a plurality of vanes positioned adjacent the bottom and extending inwardly towards the centre, the vanes having an inner portion and an outer portion, and a cover member spaced from the bottom and positioned above the vanes.

In one embodiment, the cover member is positioned over the inner portion of the vanes. The cover member may have a radial width that is from 25–75% and preferably from 25–35% of the radial length of the vanes.

In another embodiment, the vanes extend downwardly from the cover member. The vanes may have a height of at least three-quarters the distance between the bottom and the cover member. Preferably, all of the vanes are of substantially the same height. Further, preferably the vanes are substantially parallel to the longitudinal axis.

In another embodiment, the vanes extend upwardly at an angle of up to 45° to the longitudinal axis.

In another embodiment, the vanes are equidistantly spaced around the bottom.

In another embodiment, the vanes extend to the centre and the cover member has a radial width that is from 25–35% of the radial width of the cyclonic flow region.

In another embodiment, the vanes curve in the downstream direction as they extend inwardly from the outer periphery.

In another embodiment, the vanes extend radially inwardly from the outer periphery.

In another embodiment, the separator further comprises a cleaner head adapted for movement over a floor and having a fluid nozzle positionable adjacent the floor, the nozzle in fluid flow communication via a passageway with the separator fluid inlet, a handle for moving the cleaner head over the floor, and a casing for housing the cyclone chamber. The separator may further comprise a centre feed pipe, the vanes extend to the centre feed pipe and the cover member extends outwardly from the centre feed pipe, the cover member having a radial width that is from 25–75% of the radial length of the vanes.

In accordance with the instant invention, there is also provided a separator for separating entrained particles from a fluid flow, the separator comprising a cyclone chamber having a cyclonic flow region, the cyclonic flow region having a centre, a longitudinal axis, an outer peripheral portion, an inner portion and a radial width, means for introducing a fluid flow to the cyclone flow region for cyclonic rotation therein, means for removing the fluid flow from the cyclone chamber, particle receiving means disposed beneath the cyclonic flow region for receiving particles separated from the fluid flow, separations means for creating non-rotational flow regions positioned beneath the cyclonic flow region and which are have an open to for communication with the cyclonic flow region.

In another embodiment, the cyclone chamber has a bottom and comprises a sealed chamber except for the means for introducing the fluid flow and the means for removing the fluid flow and the separation means is positioned at the bottom of the cyclone chamber.

In another embodiment, the separation means comprises cover means positioned in the inner portion of the cyclonic flow region and baffle means extending in the direction of the longitudinal axis of the cyclonic flow region.

In another embodiment, the separator is incorporated into a vacuum cleaner having a cleaner head and casing in which the cyclone separator is positioned, the cyclone chamber having centre feed means, the baffle means extends inwardly to the centre feed means and the cover means extends outwardly from the centre feed means, the cover means having a radial width that is from 25–75% of the radial length of the baffle means.

In another embodiment, the separator is incorporated into a vacuum cleaner having a cleaner head and casing in which the cyclone separator is positioned, the baffle means extends inwardly to the centre and the cover means extends outwardly from the centre, the cover means having a radial width that is from 25–75% of the radial length of the baffle means.

In accordance with the instant invention, there is also provided a method for separating entrained particles from a fluid flow, the method comprising the steps of introducing a fluid to flow cyclonically in a chamber having a cyclonic flow region, the cyclonic flow region having an inner portion and an outer portion, removing particles from the fluid flow in the cyclone chamber and retaining the separated particles in a plurality of areas provided beneath the outer portion of the cyclonic flow region, each of the areas having an upper portion which is open to be in flow communication with the cyclonic flow region, and removing the fluid flow from the chamber.

In one embodiment, the method further comprises the step of using baffle means having an outer portion and an inner portion to retain the separated particles in the areas.

In another embodiment, the method further comprises the step of using a cap member positioned above the inner portion of the baffle means to reduce the reentrainment of separated particles.

In another embodiment, the method further comprises the dirt separation mechanism for a vacuum cleaner and the method further comprises passing a cleaning head over a surface to clean the surface.

BRIEF DESCRIPTION OF THE DRAWINGS

For a better understanding of the present invention, and to show more clearly how it may be carried into effect, reference will now be made by way of example to the accompanying drawings of a preferred embodiment of the present invention, in which.

DETAILED DESCRIPTION OF THE PREFERRED EMBODIMENT

The improvements in cyclonic separators described herein may be used with or in place of cyclonic separation devices of any sort which are used to separate particulate material from a fluid stream. For example, they may be used with a fluid stream consisting of one or more gasses such as industrial dust collection systems (eg. flue gas scrubbing), they may be used to classify particles according to their size or they may be used with a fluid stream consisting of one or more liquids (eg. a hydrocyclone) or with fluid streams comprising a gas/liquid mixture. It will be appreciated that they these cyclone separators may be used in any manner known in the particle separation art.

Figure 1:
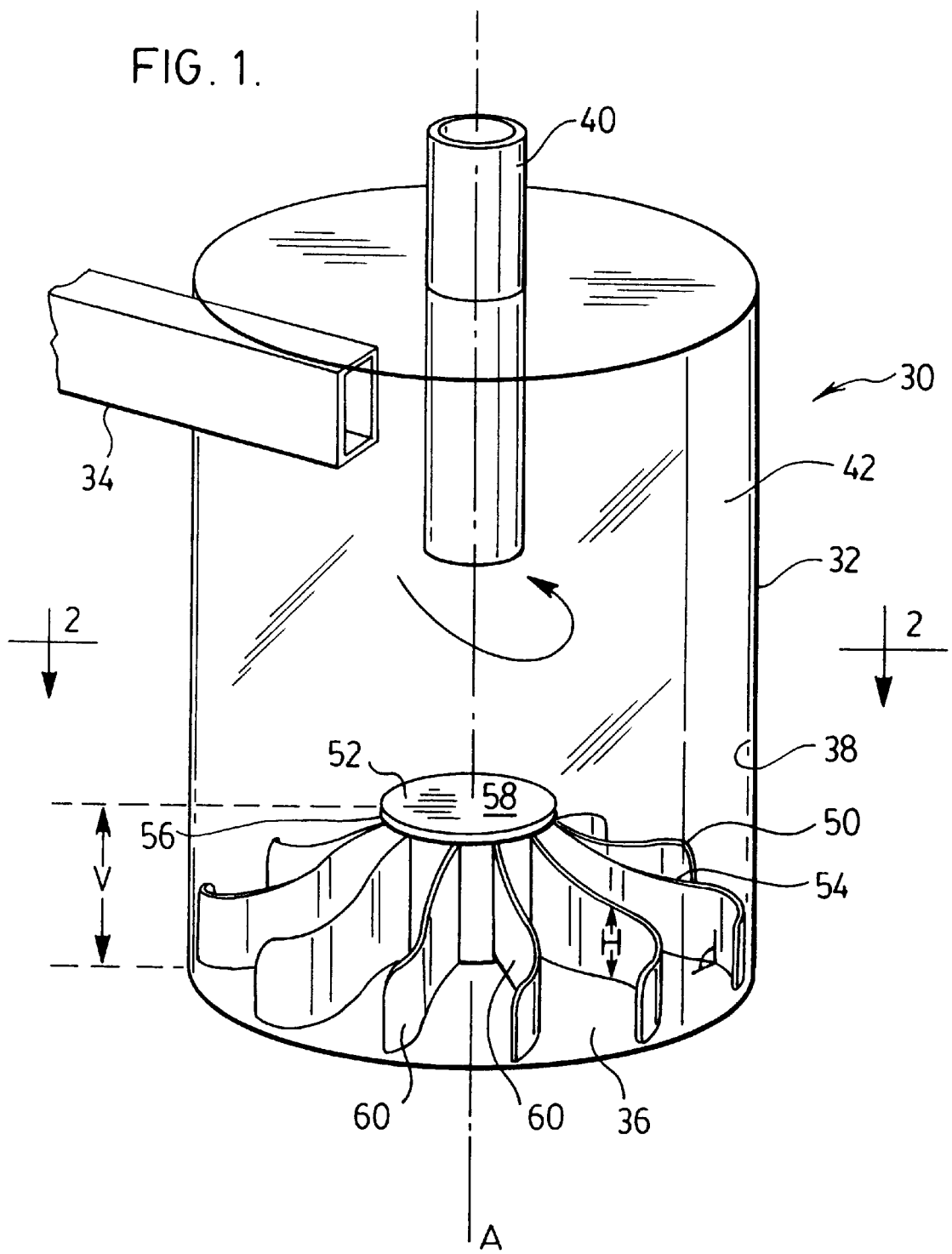
FIG. 1 is an isometric view of a cyclone separator according to the present invention.

A cyclone separator 30 according to the present invention is shown in FIG. 1. In this embodiment, separator 30 has a bin 32 having a fluid inlet 34 for introducing a cyclonic fluid flow to bin 32, a bottom 36, an exterior wall 38 and a fluid outlet 40. Bin 32 thus defines a cyclone chamber 42. Inlet 34 is any inlet capable of introducing a cyclonic flow to bin 32, and may be tangentially disposed to bin, or may be an axial or screw inlet, or other type. It will be appreciated that cyclone chamber 42 may be of any design known in the art. For example inlet 34 and outlet 40 may be positioned at any location and the wall 38 of chamber 42 may be of any construction known in the art.

Figure 2:
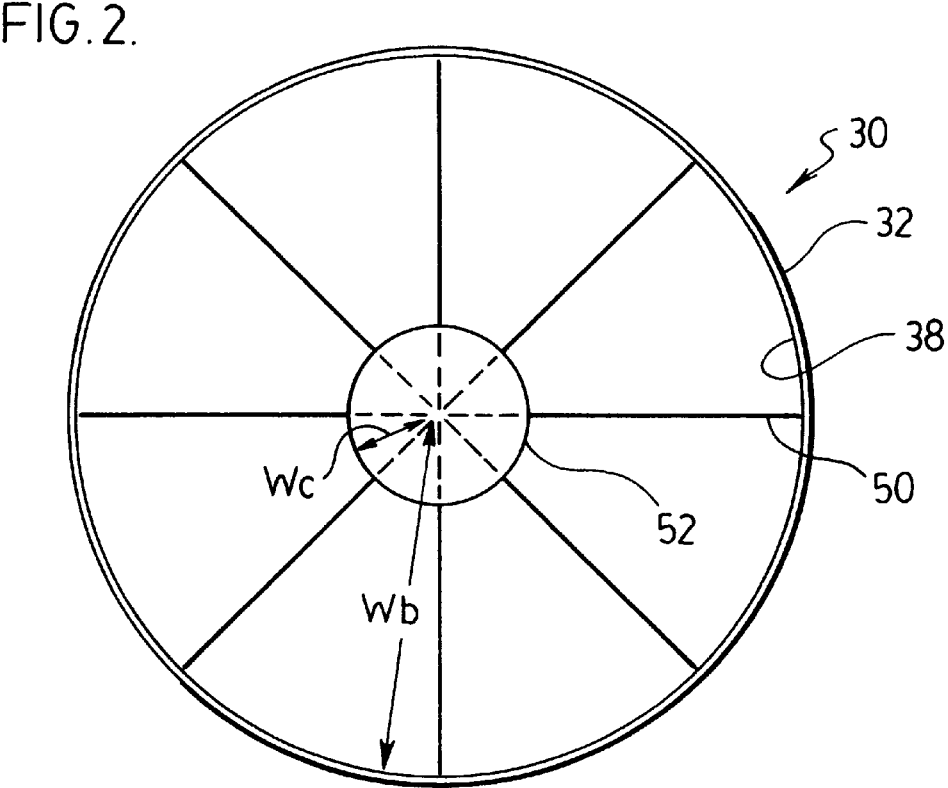
FIG. 2 is a cross-section along the line 2—2 of the cyclone chamber of FIG. 1.

Disposed above bottom 36 are a plurality of upwardly extending members or vanes 50 extending radially outwardly over bottom 36. Vanes 50 have spaced apart opposed surfaces 60 and are preferably thin members. A cap 52 is disposed above an upper edge 54 of vanes 50 in the central portion of bin 32. Cap 52 has a perimeter 56 and an upper surface 58. As shown in FIG. 2, vanes 50 extend from a position under cap 52 to wall 38. As shown in FIG. 1, cap 52 has a flat upper surface 58. However, it will be appreciated that upper surface 58 may be of any particular profile.

Vanes 50 may extend substantially radially as shown in FIG. 2 or they may be curved as shown in FIG. 1. Preferably, the vanes are planar (i.e. they extend in a straight plane). If the vanes are curved, then the vanes are preferably curved in the upstream direction, relative to the direction of cyclonic flow (as shown in FIG. 1).

Referring again to FIG. 1, in use, fluid (which may be a liquid or a gas but is preferably a gas) is introduced via inlet 34 to flow cyclonically in bin 32. As the cyclonic flow travels downwardly in bin 32, particles entrained in the fluid flow are separated therefrom and fall to bottom 36 more or less along wall 38. As the cyclonic fluid flow reaches the lower portion of bin 32, the downward direction of the flow is reversed and fluid moves inwardly and upwardly, in a cyclonic manner, to outlet 40.

Vanes 50 are separation means that create a "dead" space immediately above bottom 36 by substantially preventing cyclonic fluid flow between adjacent vanes 50. These dead spaces are regions of non-rotational flow wherein the portion of these regions that are not beneath cap 52 have an open top. The vanes act as vertically extending baffles to produce dead spaces that encourage the deposition of separated particles on bottom 36 and at least partially separates the deposited particles from the cyclonic fluid flow to impede reentrainment of the deposited particles. Some radially inward fluid flow is experienced between adjacent vanes 50, however.

Figure 3:
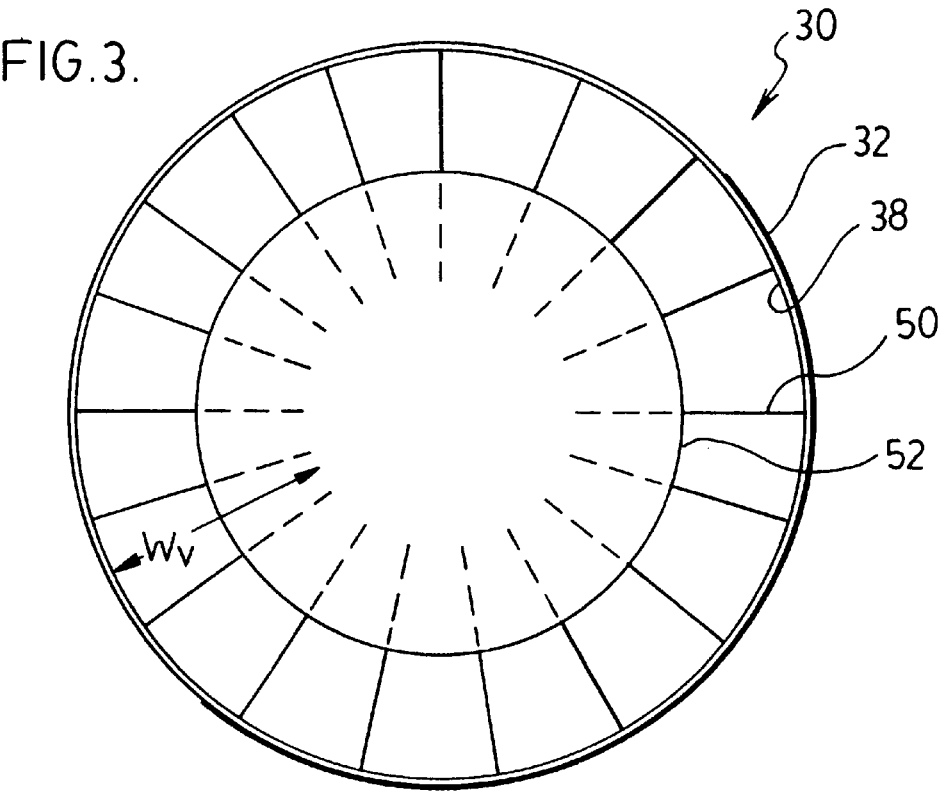
FIG. 3 is a cross-section along the line 2—2 of an alternate embodiment of the cyclone chamber of FIG. 1.

Preferably vanes 50 extend under cap 52 to reduce or inhibit the reentrainment of deposited particles (see the portion of vanes 50 in stippled lines in FIGS. 2 and 3). The portion of vanes 50 which extend under cap 52 comprise the inner portion of vanes 50 and they may be provided below the inner portion of cyclone chamber 42. The portion of the vanes 50 which cap 52 does not overlie are the outer portion of vanes 50 and they are provided below the outer or peripheral portion of cyclone chamber 42. In operation, as the radial inward fluid flow moves toward the centre of bin 32, it may reentrain some of the deposited particles. Near the centre of bin 32, the inward flow moves upwardly towards outlet 40. To impede the inward flow from retaining its entrained particles, cap 52 is provided to interfere with a smooth upward turn in fluid flow, which interference causes the upward fluid flow to shed at least a portion of the reentrained particles. Such particles fall under the influence of gravity back to bottom 36.

While the vanes 50 may end at perimeter 56 of cap 52, preferably, cap 52 extends over a significant portion of the radial length of vanes 50, more preferably about 25–75% and, most preferably, about 25–35% of the length of vanes 50 to prevent reentrainment. Thus the size of cap 52 compared to the surface area of bottom 36 may vary substantially (see for example FIGS. 2 and 3). In particular, if vanes 50 extend all the way to the centre of bin 32 (eg. as shown in FIG. 2), then cap 52 may have a radial width $W_c$ which is about 25–75% and, more preferably, about 25–35% of the radial width of bin 32 $W_b$. However, if vanes 50 do not extend all the way to the centre of bin 32 (as shown in FIG. 3), then cap 52 may have a radial width which so as to cover about 25–75% and, more preferably, about 25–35% of the radial length Wv of vanes 50. If vanes 50 do not extend all the way to the centre of bin 32, it will be appreciated that cap 52 does not have to extend all the way to the centre of bin 32. This may occur if the cyclonic flow region in bin 32 defines an annular space as opposed to a cylindrical space.

The height H of vanes 50 in the direction of the longitudinal axis A of bin 32 may be varied depending upon the size of the particles to be separated from the fluid stream, the properties of the fluid and amount of particles to be collected between emptying cycles. As particles are deposited on bottom 36, the effective depth of vanes 50 is decreased because the increased depth of settled particles on bottom 36 buries a portion of vanes 50. The height of vanes 50 is preferably chosen such that the maximum depth of particles to be collected between emptying cycles is about three-quarters of the vane height. The vertical height of vanes 50 may vary along their length, although a constant height vane is preferred. If the height of vanes 50 varies, then vanes 50 preferably have an increased height adjacent cap 52 than at wall 38 (as is shown in FIG. 1).

Vanes 50 may extend upwardly at an angle of up to about 45° to the cyclonic axis A (i.e the angle between the bottom of opposed surface 60 and axis A may be up to about 45°). Preferably, vanes 50 extend perpendicularly upwardly from bottom 36, and preferably extend generally parallel to the cyclonic axis A of the cyclonic fluid flow in bin 32.

Vanes 50 may extend in the space between bottom 36 and the lower surface of cap 52. Preferably, vanes 50 preferably have a height equal to about three-quarters of the vertical distance V between cap 52 and bottom 36. Preferably vanes 50 extend downwardly from cap 52 towards bottom 36 (in which case there may be a gap between the bottom of vanes 50 and bottom 36 which has a height equal to about one-quarter of the vertical distance V between cap 52 and bottom 36) and they may extend to contact bottom 36 (eg. see FIG. 1). If cap 52 is positioned farther from vanes 50, the beneficial anti-reentrainment properties of the present invention are reduced.

Figure 4:
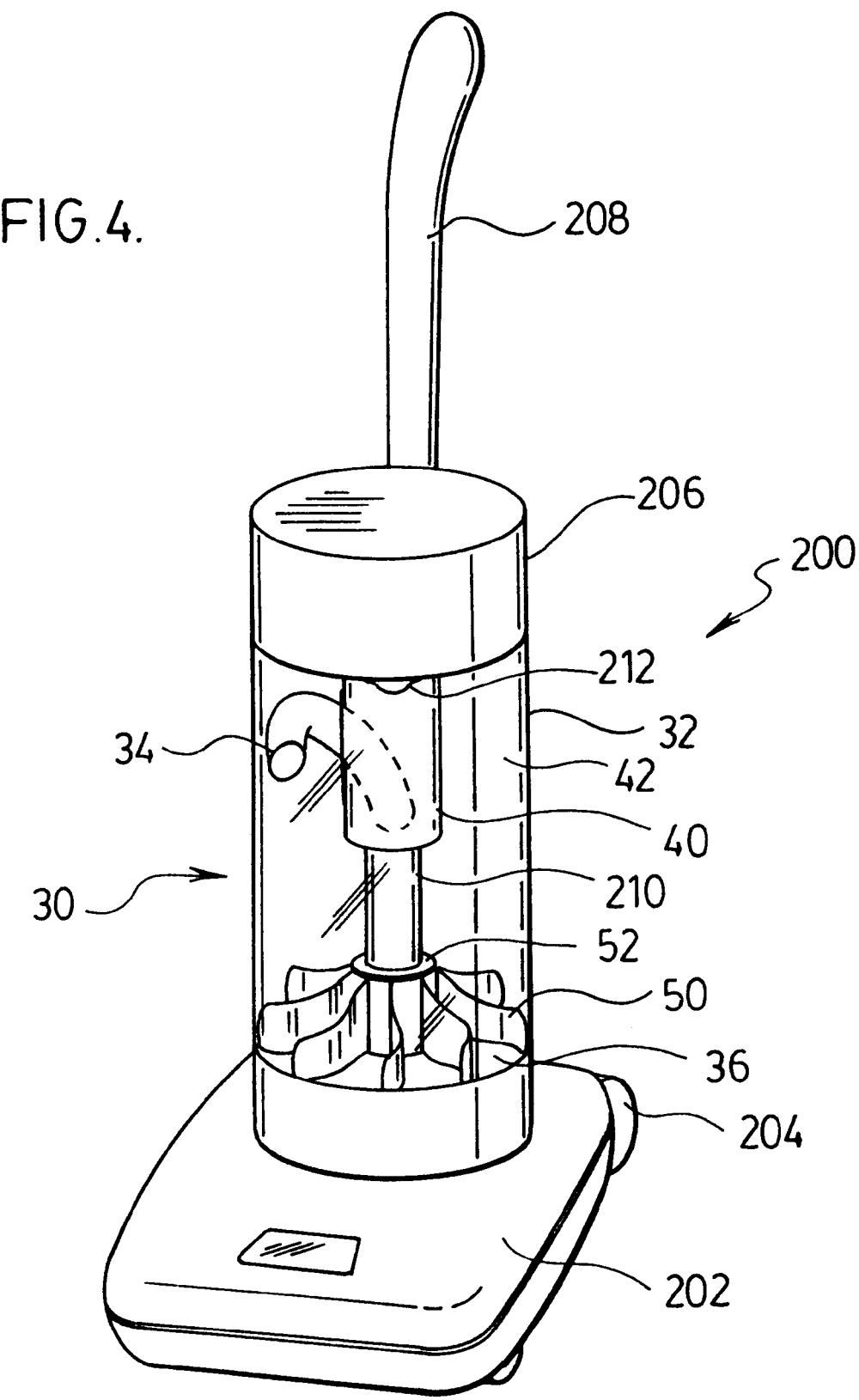
FIG. 4 is an isometric view of a household vacuum cleaner incorporating a cyclone separator according to the present invention; and, FIG. 5 is an enlarged isometric view of the removable bin of the vacuum cleaner of FIG. 4.
Figure 5:
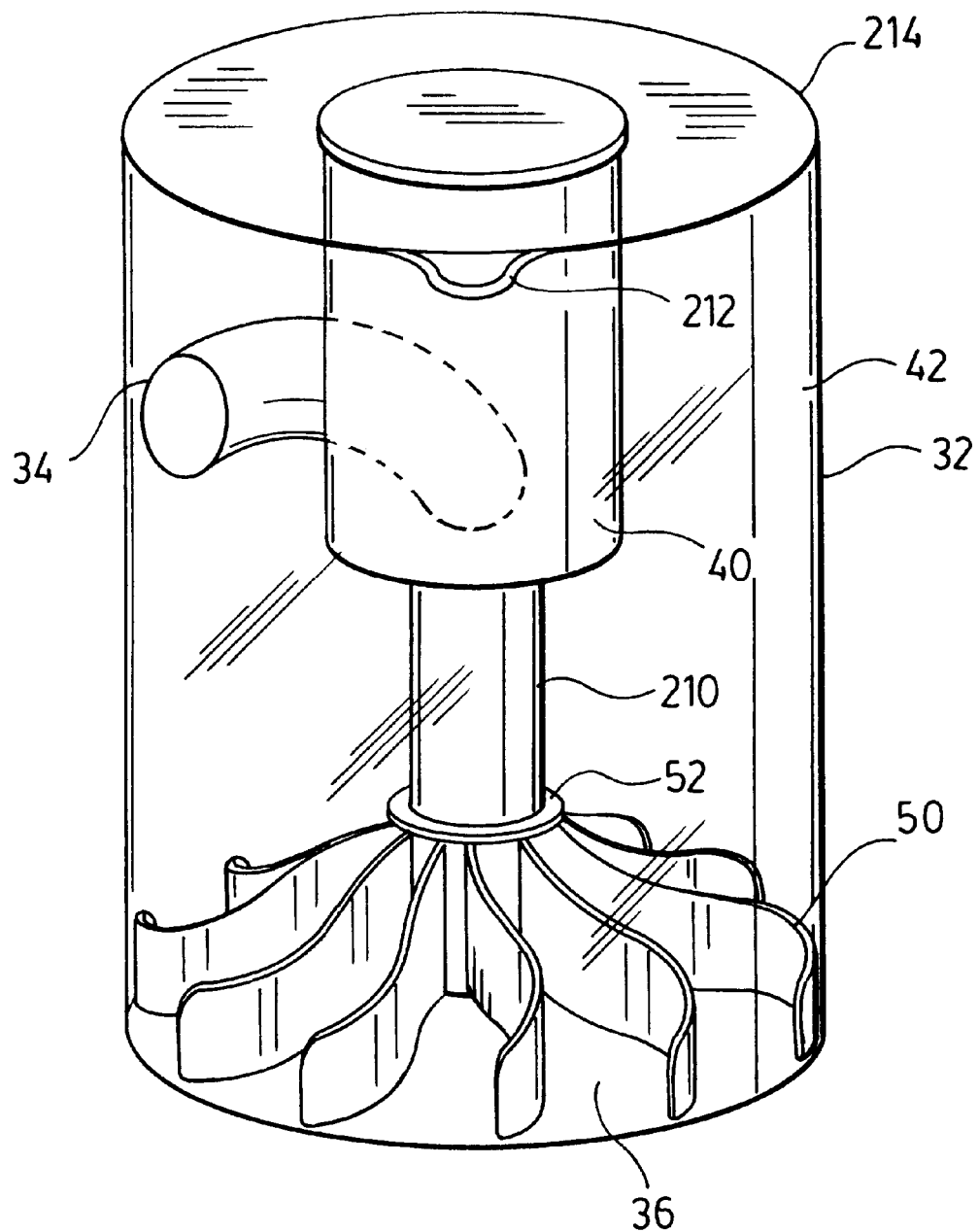

In the one application as exemplified in FIGS. 4 and 5, cyclone separator may be used as the cyclone separator for a vacuum cleaner. While separator 30 may be used in any vacuum cleaner (eg. upright, canister or a central vacuum cleaning system), it will be described as it may be used in an upright vacuum cleaner.

In this application, separator 30 according to the present invention is incorporated into a domestic upright vacuum cleaner, indicated generally at 200. Vacuum cleaner 200 has a floor cleaning head 202, having glide means (eg. wheels 204) for moving the cleaner head across a floor, a main casing 206 rotatably attached to cleaner head 202, and a handle 208 for moving cleaner 200 across the floor. Main casing 206 houses separator 30. In this embodiment, separator 30 comprises a central air feed conduit 210 in communication with a air nozzle (not shown) adjacent the floor in cleaner head 202, and leading to a curved air inlet 34.

Bin may be removable mounted in main casing 206 by any means known in the art. For example, referring to FIG. 5, bin 32 may be removable from main casing 206 via the application of finger pressure to a handle 212. Bin 32 has an open end 214 and defines a cyclone chamber 42. Bottom 36 has a plurality of vanes 50 extending thereacross. An air outlet is disposed centrally in an upper portion of cyclone chamber 42.

In use, an air flow created by a motor (not shown) is created in vacuum cleaner 200 drawing air from the nozzle of cleaner head 202, through centre air feed conduit 210 and introduced to cyclone chamber 42 via inlet 34. Cyclonic flow is maintained in cyclone chamber 42 thereby causing particles entrained in the cyclonic flow to be deposited on bottom 36. Vanes 50 act to separate the cyclonic air flow from bottom 36, thus impeding reentrainment, as described above. Air then exits cyclone chamber via air outlet 40, though the motor and then exits the cleaner.

After operation of vacuum cleaner 200, particles of varying size collect on bottom 36 in bin 32. To empty such collected contents, bin 32 is removed from main casing 206, such as via handle 212, and inverted (typically over a refuse collector of the like) to cause the collected particles on bottom 36 to fall from bin 32 under the influence of gravity. Bin 32 is then returned to its upright position and reinstalled in cleaner 200, in preparation of further use.

Accordingly, the vane members according to the present invention provide beneficial particle separation characteristics in a cyclone separator. The vane members provide for a physical separation between the deposited particles in the bottom of the cyclone and the cyclonic flow above the vane members, thereby beneficially reducing the reentrainment of deposited particles into these fluid flow. Performance of the cyclone separator is thereby enhanced.

While the above description constitutes the preferred embodiments, it will be appreciated that the present invention is susceptible to modification and change without departing from the fair meaning of the proper scope of the accompanying claims.

We claim:

1. A separator for separating entrained particles from a fluid flow, the separator comprising:

a) a cyclone chamber having a cyclonic flow region and a closed bottom, the cyclonic flow region having a center, a longitudinal axis, an outer peripheral portion, an inner portion and a radial width;

b) a fluid inlet for introducing a cyclonic fluid flow to the cyclonic flow region;

c) a fluid outlet for removing the fluid flow from the cyclone flow region;

d) a plurality of vanes positioned adjacent the bottom and extending inwardly towards the center, the vanes having an inner portion and an outer portion and creating a dead space immediately above the bottom; and, e) a cover member spaced from the bottom and positioned above the vanes.

2. The separator of claim 1 wherein the cover member is positioned over the inner portion of the vanes.

3. The separator of claim 1 wherein the cover member has a radial width that is from 25–75% of the radial length of the vanes.

4. The separator of claim 1 wherein the cover member has a radial width that is from 25–35% of the radial length of the vanes.

5. The separator of claim 3 wherein the vanes extend downwardly from the cover member.

6. The separator of claim 5 wherein the vanes have a height of at least three-quarters the distance between the bottom and the cover member.

7. The separator of claim 1 wherein all of the vanes are of substantially the same height.

8. The separator of claim 1 wherein the vanes are substantially parallel to the longitudinal axis.

9. The separator of claim 1 wherein the vanes extend upwardly at an angle of up to 45° to the longitudinal axis.

10. The separator of claim 1 wherein the vanes are equidistantly spaced around the bottom.

11. The separator of claim 1 wherein the vanes extend to the center and the cover member has a radial width that is from 25–35% of the radial width of the cyclonic flow region.

12. The separator of claim 1 wherein the vanes curve in the downstream direction as they extend inwardly from the outer periphery.

13. The separator of claim 1 wherein the vanes extend radially inwardly from the outer periphery.

14. The separator of claim 1 further comprising:

(a) a cleaner head adapted for movement over a floor and having a fluid nozzle positionable adjacent the floor, the nozzle in fluid flow communication via a passageway with the separator fluid inlet;

(b) a handle for moving the cleaner head over the floor; and, (c) a casing for housing the cyclone chamber.

15. The separator of claim 14 further comprising a center feed pipe, the vanes extend to the center feed pipe and the cover member extends outwardly from the center feed pipe, the cover member having a radial width that is from 25–75% of the radial length of the vanes.

16. A separator for separating entrained particles from a fluid flow, the separator comprising:

a) a cyclone chamber having a cyclonic flow region, the cyclonic flow region having a center, a longitudinal axis, an outer peripheral portion, an inner portion and a radial width;

b) means for introducing a fluid flow to the cyclone flow region for cyclonic rotation therein;

c) means for removing the fluid flow from the cyclonic flow region;

d) particles receiving means disposed beneath the cyclonic flow region for receiving particles separated from the fluid flow and having a sealed bottom;

e) separation means for creating non-rotational flow regions positioned beneath the cyclonic flow region and which are open to communication with the cyclonic flow region.

17. The separator of claim 16 wherein the cyclone chamber has a bottom and comprises a sealed chamber except for the means for introducing the fluid flow and the means for removing the fluid flow and the separation means is positioned at the bottom of the cyclone chamber.

18. The separator of claim 16 wherein the separation means comprises cover means positioned in the inner portion of the cyclonic flow region and baffle means extending in the direction of the longitudinal axis of the cyclonic flow region.

19. The separator of claim 18 wherein the cover means has a radial width that is from 25–75% of the radial length of the baffle means.

20. The separator of claim 18 wherein the cover means has a radial width that is from 25–35% of the radial length of the baffle means.

21. The separator of claim 19 wherein the baffle means extend downwardly from the cover member.

22. The separator of claim 20 wherein the baffle means have a height of at least three-quarters the distance between the bottom and the cover means.

23. The separator of claim 18 wherein the baffle means are substantially parallel to the longitudinal axis.

24. The separator of claim 18 wherein the baffle means extend upwardly at an angle of up to 45° to the longitudinal axis.

25. The separator of claim 18 wherein the separator is incorporated into a vacuum cleaner having a cleaner head and casing in which the cyclone separator is positioned, the cyclone chamber having center feed means, the baffle means extends inwardly to the center feed means and the cover means extends outwardly from the center feed means, the cover means having a radial width that is from 25–75% of the radial length of the baffle means.

26. The separator of claim 18 wherein the separator is incorporated into a vacuum cleaner having a cleaner head and casing in which the cyclone separator is positioned, the baffle means extends inwardly to the center and the cover means extends outwardly from the center, the cover means having a radial width that is from 25–75% of the radial length of the baffle means.

27. A method for separating entrained particles from a fluid flow, the method comprising the steps of:

(a) introducing a fluid to flow cyclonically in a chamber having a cyclonic flow region, the cyclonic flow region having an inner portion and an outer portion;

(b) removing particles from the fluid flow in the cyclone chamber and retaining the separated particles in a plurality of areas provided beneath the outer portion of the cyclonic flow region, each of the areas having an upper portion which is open to be in flow communication with the cyclonic flow region; and, (c) removing the fluid flow from the chamber.

28. The method as claimed in claim 27 further comprising the step of using baffle means having an outer portion and an inner portion to retain the separated particles in the areas.

29. The method as claimed in claim 28 further comprising the step of using a cap member positioned above the inner portion of the baffle means to reduce the reentrainment of separated particles.

30. The method of claim 27 wherein the separator comprises the dirt separation mechanism for a vacuum cleaner and the method further comprises passing a cleaning head over a surface to clean the surface.

* * * * *